Nov. 1, 1966 JAMES E. WEBB 3,283,175

ADMINISTRATOR OF THE NATIONAL AERONAUTICS AND SPACE ADMINISTRATION

A.C. LOGIC FLIP-FLOP CIRCUITS

Filed Jan. 8, 1964 2 Sheets-Sheet 1

TED WINKLER
INVENTOR.

BY G. D. O'Brien
Howard B. Scheckman
ATTORNEYS

Nov. 1, 1966 JAMES E. WEBB 3,283,175
ADMINISTRATOR OF THE NATIONAL AERONAUTICS
AND SPACE ADMINISTRATION
A.C. LOGIC FLIP-FLOP CIRCUITS
Filed Jan. 8, 1964 2 Sheets-Sheet 2

TED WINKLER
INVENTOR.

BY [signature]
Howard B. Scheckman
ATTORNEYS 3,283,175
A.C. LOGIC FLIP-FLOP CIRCUITS
James E. Webb, Administrator of the National Aeronautics and Space Administration, with respect to an invention of Ted Winkler
Filed Jan. 8, 1964, Ser. No. 336,607
4 Claims. (Cl. 307—88.5)

This invention relates to bistable multivibrator or "flip-flop" circuits and has particular reference to such a circuit which is characterized by high-speed and low power dissipation.

As is well known to those versed in the art, a flip-flop comprises a bistable multivibrator consisting normally of two active devices, such as transistors, interconnected by electric networks. The portion of the output voltage of each is applied to the input of the other and is of such fixed magnitude and polarity as to maintain the devices alternately conducting over controllable periods of time. The voltage waveform from the output of each of the devices is essentially rectangular in form. Either of the two devices may remain conducting with the other non-conducting, until the application of an external triggering pulse. Flip-flops play an important role in the arithmetic operations of digital computers, in modern frequency and time measuring equipment, and in various circuit combinations in many data handling systems.

There are many applications for a flip-flop capable of high-speed transition between stable states. Generally the rapidity of the transition from one stable state to another is detrimentally affected by the circuit from which the triggering input pulse is derived and, in fact, that circuit may be such as to render the triggering unreliable in the event that the triggering pulse is of very short duration. Also, since very large numbers of flip-flop circuits are employed in many digital computer systems it is desirable to minimize the power consumption of the individual circuits. In accordance with the present invention, these objectives are accomplished by providing a flip-flop incorporating a cascaded emitter-follower and which has exceptional high-speed and low power dissipation.

It is therefore, the principal object of the invention to provide a novel and improved flip-flop circuit and method of operation whereby the operating time of the circuit and the power dissipation thereof are significantly reduced.

Another object of the invention is to provide a novel and improved flip-flop circuit employing cascaded emitter-followers.

Still another object of the invention is to provide a novel and improved flip-flop circuit which employs A.C. logic and which is capable of extremely rapid transition.

Another object of the invention is to provide a novel and improved flip-flop circuit employing solid state active devices.

It is yet another object of the invention to provide a novel and improved flip-flop circuit which does not require both positive and negative power supplies.

Still another object of the invention is the improvement of flip-flop circuits generally.

A general object of the invention is to provide a novel and improved flip-flop circuit which overcomes disadvantages of previous means and methods heretofore intended to accomplish generally similar purposes.

Other advantages, features, and additional objects of the present invention will become manifest to those versed in the art upon making reference to the detailed description and the accompanying drawings in which a preferred embodiment, incorporating the principles of the present invention is shown by way of illustrative example. In the figures.

Figure 1:
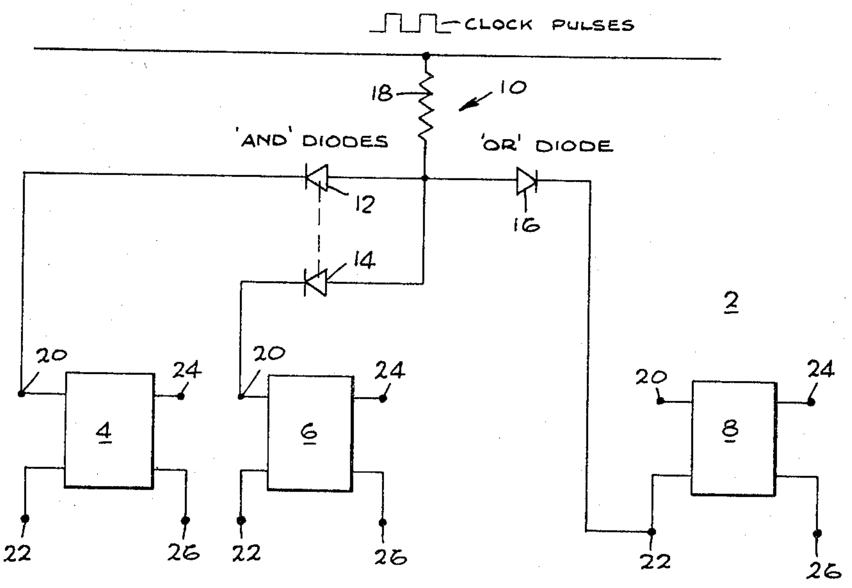
FIG. 1 is a schematic diagram of the invention as employed in a computer logic circuit.

Referring to FIG. 1 there is shown a portion of a computer logic circuit 2 to illustrate use of the "flip-flop" circuits.

Elements numbered 4, 6 and 8 represent individual identical flip-flop circuits of this invention. The flip-flop circuits are connected to a gate 10 comprising "AND" diodes 12, 14, "OR" diode 16 and resistor 18. The "AND" diodes are connected to output terminals 20 of elements 4 and 6 and the "OR" diode to input terminal 22 of element 8. Other gates would in turn be connected to output terminals 24 and input terminals 26 respectively.

A clock pulse (CP) is applied to gate 10. Clock pulse current will be directed through the "OR" diode 16 to input terminal 22 only if all "AND" diodes 12 and 14 are connected to flip-flop outputs 20 that are in the "true" or off condition. The clock pulse current will not be directed to the "OR" diode and terminal 22 if either or both of the flip-flop circuits of the "AND" diodes 12, 14 are in a "false" or on condition.

Figure 2:
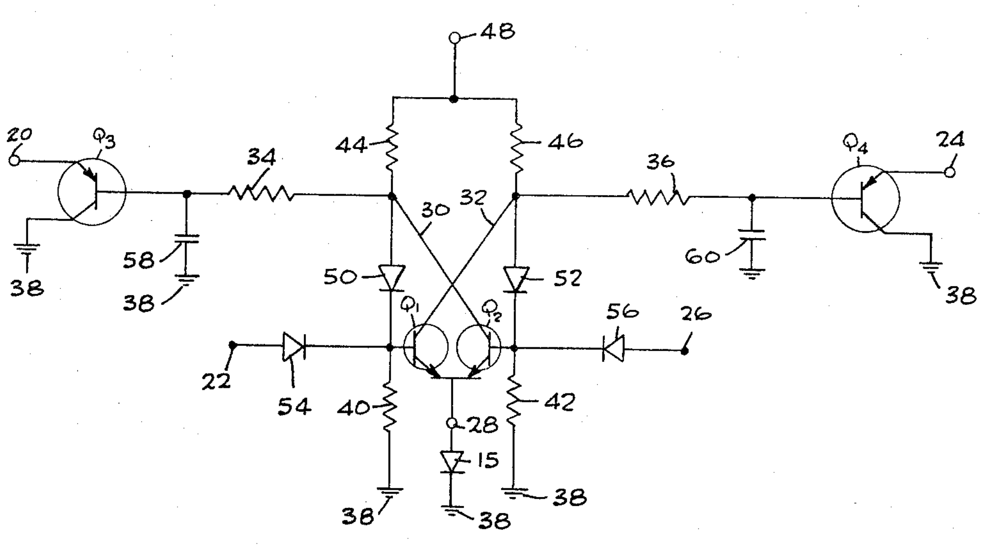
FIG. 2 is a schematic diagram of a flip-flop circuit according to the invention.

Looking now at FIG. 2, there is shown a typical embodiment of the present invention which may employ a pair of silicon transistors Q1 and Q2 as the active switching elements and a pair of germanium transistors Q3 and Q4 as emitter-followers. While the preferred embodiment employs both silicon and germanium transistors, it should be understood that the circuit may be modified to incorporate all silicon transistors, as will become apparent hereinafter. The flip-flop circuit includes transistors Q1 and Q2, both of which are npn types, having their emitters connected to a common diode 15. Diode 15 provides a slight voltage drop to provide a positive potential at its anode which may, for example, be of the order of +0.6 volt. This source of potential appears at terminal 28. Criss cross connections 30 and 32 connect the collectors of transistors Q2 and Q1 through resistances 34 and 36 to the bases of transistors Q3 and Q4, respectively. The collectors of pnp transistors Q3 and Q4 are grounded. The bases of transistors Q1 and Q2 are referenced to ground 38 through resistances 40 and 42, respectively. Load resistors 44 and 46 are connected to positive supply terminal 48, which may have a potential of the order of +6 volts applied thereto. As can be seen, in this embodiment no negative power supplies are necessary. Load resistors 44 and 46 are connected to the bases of transistors Q1 and Q2 through diodes 50 and 52, respectively. Diodes 50 and 52 are preferably of the silicon type. The input terminals to the respective bases of transistors Q1 and Q2 are indicated at 22 and 26, and in accordance with the invention there are interposed between these terminals and the bases of the respective transistors Q1 and Q2 diodes 54 and 56 which may be of the silicon type. The emitter of transistor Q3 is connected to terminal 20 and the emitter of transistor Q4 is connected to terminal 24, through which the respective outputs of these transistors may be obtained. The function of capacitors 58 and 60 which are connected between ground 38 and the bases of transistors Q3 and Q4, respectively, will be described hereinafter.

Essentially the circuit comprises switching transistors Q1 and Q2 and transistor amplifiers Q3 and Q4. The bases of amplifiers Q3 and Q4 are biased by the switching transistors Q1 and Q2.

The impedance network comprising resistors 40, 42, 44 and 46, and diodes 50 and 52 is such that with no current flowing to the collector of one switching transistor (e.g. Q2), the voltage at the base of the second (e.g. Q1) is slightly negative with respect to the emitter. This is illustrated at the beginning of the waveforms identified as $Q_{1b}$, $Q_{2b}$ in FIG. 2 which indicate the change in base voltage of transistors Q1, Q2 with respect to time, using the emitter voltage as a reference. The current in the collector circuit of the second transistor (Q1) causes a voltage drop across the collector load resistor 46, which in turn lowers the voltage at the base of the first transistor (Q2) to a sufficiently negative value to continue to prevent collector current flow (see the waveform indicated at $Q_{2c}$ and $Q_{1c}$ in FIG. 2 which indicate the change in collector voltage of these transistors with respect to time, using the emitter voltage as a reference). This condition of one transistor off (Q2) and the second (Q1) on will be maintained as long as the circuit remains undisturbed.

The circuit is designed to respond to A.C. logic signals. In a typical application, the input to the circuit is provided through a pair of gating structures comprising "AND" and "OR" gates which accept recurring clock pulses from any suitable clock. In a typical construction, the clock pulses may have a positive-going polarity. The gating structure is pulsed continuously from the clock and the clock time is small compared to the period of operation of the flip-flop circuit as can be seen in the first waveform of FIG. 3. Therefore, the duty cycle of the circuit will be small and standby power dissipation will be kept to a minimum.

Referrings to FIGS. 1 and 2, the flip-flop circuit operates in the following manner: assume that transistors Q1 and Q3 are connected to the logic circuit shown in solid lines, transistors Q2 and Q4 are connected to a second logic circuit (not shown), and transistor Q3 is conductive.

The clock pulse voltage is applied across resistor 18 and produces a clock current. This current will flow through the "AND" diodes 12, 14 or the "OR" diodes 16 depending on the bias on the base of the output transistors Q3 in elements 4 and 6. Since transistor Q2 in element 6 is conducting the output transistors Q3 is in the false (on) logic state (+0.9 volt), that is, transistor Q3's base is so biased that a positive pulse at its emitter will cause it to conduct (see waveform Q3 base, FIG. 3). The clock pulse current will flow from ground 38 through the collector of transistor Q3, its emitter, output terminal 20 and then through diode 14. In effect, an on transistor Q3 will shunt the clock pulse current away from the "OR" diode. As a result the current will not be directed to the "OR" circuit.

However, if the base of all transistors Q3 in elements 4 and 6 of the "AND" gate are biased so that they are in the "true" (off) logic state (+1.6 volts), the "AND" diodes will be back biased with respect to the voltage across the "OR" diode. As a result the clock current will then be directed to the input 22 of transistors Q1 and will provide a high positive bias on the base of transistor Q1. This causes transistor Q1 to conduct and turns transistor Q2 off. This also puts a high negative bias on pnp transistor Q3. Transistor Q3 is now conditioned to conduct when a positive clock pulse is applied to output terminal 20 of its emitter and is now in the "true" (on) state. It will be noted that amplifying transistors Q3 and Q4 are off until they are actually queried by a clock pulse.

The RC delay network comprising resistor 34 (36) and capacitor 58 (60) prevents change of potential at the base of transistor Q3 (Q4) during the time a clock pulse is applied at output points 20 (24). This prevents a second clock pulse, being applied at input terminal 22 (26) from another logic circuit changing the state of transistor Q3 (Q4). Otherwise there would be the possibility of transistor Q3 (Q4) changing from on to off or vice versa during the first clock pulse.

Diodes 50 (52) and 54 (56) prevent waste of clock pulse power. Diode 50 (52) blocks the positive clock pulse current by providing a high impedance path to prevent part of the current from dissipating through resistor 44 (46), while diode 54 (56) provides a very low impedance path. This arrangement permits a decrease in the clock pulse current necessary to fire transistors Q1 (Q2) and results in a considerable saving in power.

As can be seen, amplifiers Q3 and Q4 remain off and do not use power until two events take place: (1) the proper transistor Q1 (Q2) in the switching circuit is conducting so that the correct bias is applied to the base of the amplifying transistor Q3 (Q4), and (2) a clock pulse is applied to the emitter of the amplifying transistor. Therefore, little power is used.

Figure 3:
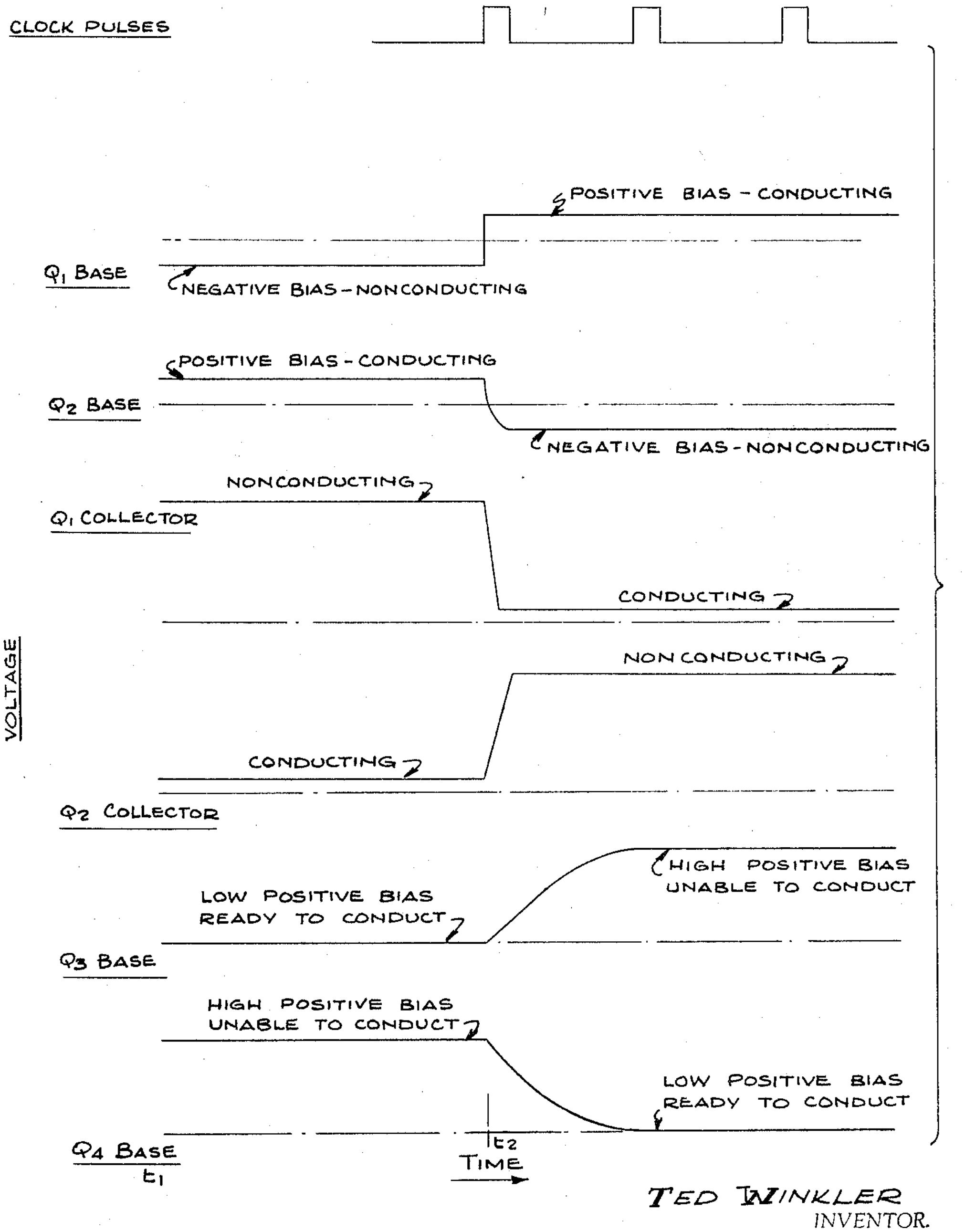
FIG. 3 is a waveform timing chart of assistance in the exposition of the invention.

The various waveforms in FIG. 3 show the function of the four transistors during the above described sequence.

As can be seen from the foregoing description, the invention provides a flip-flop circuit which operates at a speed much higher than that heretofore realized with flip-flop circuits of similar types. Also the circuit of the invention draws little power during the interval between transitions from state to state. Since certain changes may be made in the above described embodiment of the invention without departing from the scope of the invention herein involved, it is intended that all matter contained in the above description or shown in the accompanying drawings shall be interpreted as illustrative and not in a limiting sense. For example, it will be apparent to those versed in the art that silicon transistors may be substituted for germanium transistors Q3 and Q4 by the application of negative or zero bias voltages to the bases of Q3 and Q4 and by the interposition of a suitable RC network into the circuit between diode 50 (52) and load resistance 44 (46) respectively.

It being understood that various omissions, substitutions and changes in the form and details of the device illustrated and in its operation may be made by those skilled in the art, without departing from the spirit of the invention, it is intended that the invention be limited only as indicated by the scope of the following claims.

What is claimed is:

1. In combination:

first, second, third, and fourth transistors each having a base, a collector and an emitter;

a first circuit means connecting the base of said first transistor with the collector of said second transistor;

a second circuit means for connecting the base of said second transistor with the collector of said first transistor;

a first delay network connecting the base of said third transistor to said first circuit means;

a second delay network connecting the base of said fourth transistor to said second circuit means;

a means for applying recurring clock pulses to the bases of said first and second transistors to vary the bias of said third and fourth transistors via corresponding ones of said delay networks; and to the emitters of said third and fourth transistors to cause conduction of one or the other thereof, as determined by the bias applied thereto from said first and second transistors.

2. The combination as defined in claim 1 wherein said first and second circuit means each include a series connected unidirectional current conducting element.

3. The combination as defined in claim 1 wherein said recurring clock pulses are applied through a first diode connected to the base of said first transistor and a second diode connected to the base of said second transistor.

4. The combination of a flip-flop circuit comprising:

a pair of regeneratively cross-coupled switching transistors each having a base, an emitter, and a collector; said emitters being connected in common and said bases and collectors being cross-coupled;

a source of operating potential;

a source of bias potential connected to said common-connected emitters;

a pair of coupling networks connecting respective ones of said switching transistors to said source of operating potential;

a pair of amplifying transistors each having a base, an emitter, and a collector; the collector of each of said amplifying transistors being connected to ground:

a means connected to the emitters of said amplifying transistors and to the base of said switching transistors for applying a recurring clock pulse thereto;

a pair of delay networks connecting the bases of corresponding ones of said amplifying transistors to corresponding ones of said coupling networks;

a pair of diodes connected to the bases of corresponding ones of said switching transistors; and said amplifying transistors connected to permit or prevent applications of said clock pulse to said diodes to transfer the state of conduction of said switching transistors to control the bias of said amplifying transistors.

References Cited by the Examiner

UNITED STATES PATENTS 3,008,055 11/1961 Crosby et al. ------- 307—88.5

ARTHUR GAUSS, *Primary Examiner.*

D. D. FORRER, *Assistant Examiner.*